United States Patent
Tourigny

(10) Patent No.: US 9,798,093 B2
(45) Date of Patent: Oct. 24, 2017

(54) ARTICLE FOR CLEANING OPTICAL FIBERS

(71) Applicant: Zynon Technologies, LLC, New Britain, CT (US)

(72) Inventor: Jay S. Tourigny, Collinsville, CT (US)

(73) Assignee: ZYNON TECHNOLOGIES, LLC, New Britain, CT (US)

( * ) Notice: Subject to any disclaimer, the term of this patent is extended or adjusted under 35 U.S.C. 154(b) by 0 days.

(21) Appl. No.: 14/735,797

(22) Filed: Jun. 10, 2015

(65) Prior Publication Data

US 2016/0011380 A1    Jan. 14, 2016

Related U.S. Application Data

(60) Provisional application No. 62/023,543, filed on Jul. 11, 2014.

(51) Int. Cl.
*G02B 6/38* (2006.01)
*G02B 6/32* (2006.01)

(52) U.S. Cl.
CPC ............ *G02B 6/3866* (2013.01); *G02B 6/32* (2013.01); *G02B 6/3853* (2013.01)

(58) Field of Classification Search
USPC ........................................................ 385/134
See application file for complete search history.

(56) References Cited

U.S. PATENT DOCUMENTS

| | | | |
|---|---|---|---|
| 5,023,971 A * | 6/1991 | Pompe | G02C 13/008 15/104.92 |
| 5,325,452 A | 6/1994 | Stein et al. | |
| 5,557,696 A | 9/1996 | Stein | |
| 5,925,191 A * | 7/1999 | Stein | B08B 1/00 134/6 |
| 5,993,560 A * | 11/1999 | Wasak | A46B 7/023 134/42 |
| 6,485,822 B1 * | 11/2002 | Osiecki | A47L 13/16 15/118 |
| 6,807,705 B2 * | 10/2004 | Piombini | A47L 11/4041 15/230 |
| 6,810,552 B2 | 11/2004 | Miyake et al. | |
| 7,401,374 B2 | 7/2008 | Tourigny | |
| 7,685,668 B2 | 3/2010 | Tourigny | |
| 8,556,521 B2 | 10/2013 | Everett et al. | |
| 2003/0203180 A1 * | 10/2003 | Tourigny | B08B 1/00 428/304.4 |

(Continued)

*Primary Examiner* — Eric Wong
(74) *Attorney, Agent, or Firm* — Cantor Colburn LLP

(57) ABSTRACT

The cleaning head (30, 40, 44, 130) of a swab-like cleaning device (28, 36, 42, 134) for cleaning optical fiber end faces, especially the lens of expanded beam ("EB") optical fibers, has a concave configuration of its cleaning surface (30a, 40a, 44a). This provides for effective engagement of the cleaning surface with the convex, e.g., spherical or nearly spherical, light transmission surfaces of the lenses (16a, 16b) of EB optical fibers. The cleaning head comprises coherent bodies of sintered polymers and may have zones of different density. Deformability of at least that portion of the cleaning head (30, 40, 44, 130) which terminates in the cleaning surface (30a, 40a, 44a) facilitates use of the cleaning device for non-EB as well as EB optical fiber end faces by better conforming the cleaning surface to the end faces during cleaning of the end faces.

17 Claims, 3 Drawing Sheets

(56) References Cited

U.S. PATENT DOCUMENTS

2006/0286902 A1* 12/2006 Covarrubias ...... B23K 26/0823
451/5
2007/0217748 A1 9/2007 Kobrin

* cited by examiner

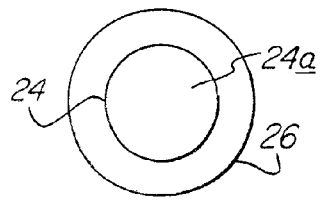
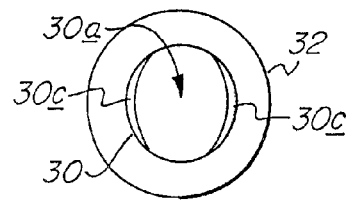
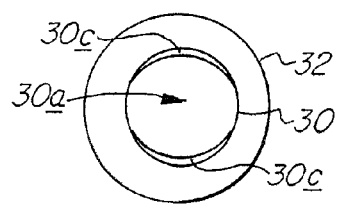
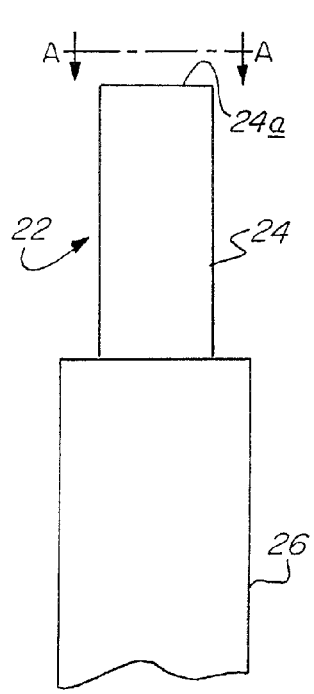
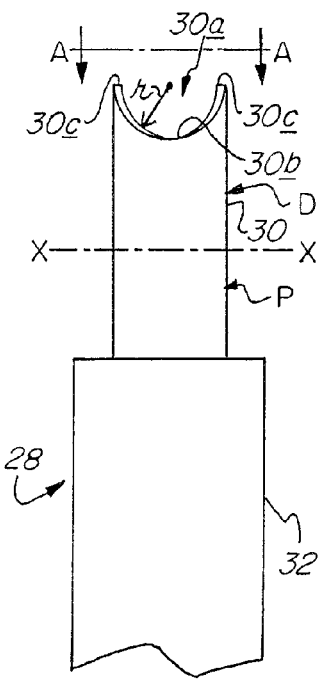
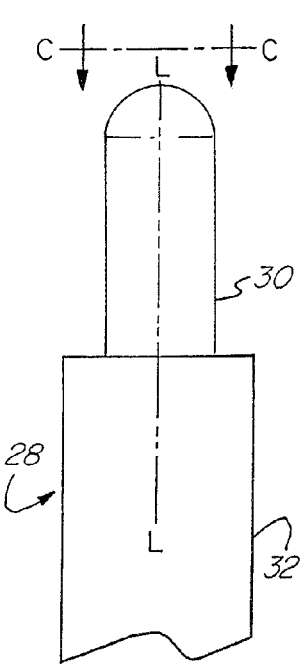
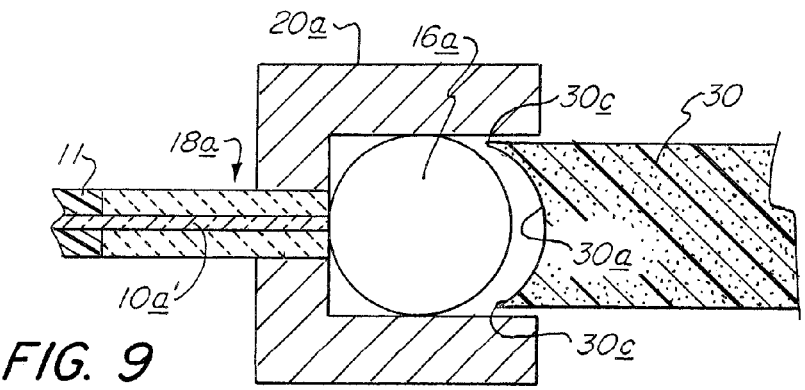

ARTICLE FOR CLEANING OPTICAL FIBERS

CROSS-REFERENCE TO RELATED APPLICATION

This application claims priority of provisional patent application Ser. No. 62/023,543 filed on Jul. 11, 2014 in the name of Jay S. Tourigny and entitled "Article For Cleaning Optical Fiber Lenses".

BACKGROUND OF THE INVENTION

Field of the Invention

The present invention generally relates to cleaning devices for mechanically cleaning optical fiber end faces and, in particular, to devices for cleaning lensed optical fiber end faces. Such optical fibers are typically installed in a ferrule connector, such as a plug or a bulkhead, for interconnection with another optical fiber or with an optoelectronic device.

In fiber optic networks, optical fiber strands, which typically are encased in a sheath disposed around the fiber optic core and have a core diameter of about 8 micrometers, are connected to each other by placing the ends of the optical fiber strands in abutting contact with each other. As is well known, one or more of the strands may be encased in protective jackets to form fiber optic cables. Two such cables may be connected to each other by placing the cable ends together in abutting contact with each other, with the optical fiber strands of one cable in alignment with those of the other cable. To do this, the ends of the individual fiber optic strands or cables are typically stripped of their protective jackets and bonded to and encased in the center of a rod-like ceramic ferrule, with the end of each optical fiber strand exposed in the end face of the ferrule.

All fiber optic connections are highly susceptible to contamination at the abutting end faces of the optical fiber ferrules. Specifically, the optical transmission capability of the junction between the optical fibers can be significantly impaired by microscopically small contaminant deposits on the end surfaces of the fibers. Sources of such contamination include smoke, dust, dirt, moisture and other ambient contaminates; oils, salts and particles transferred from the skin of technicians during connector manufacture and assembly, cable installation, or job site service work. Small amounts of contamination in the form of particles or haze will significantly increase light attenuation across the abutted connection. Therefore, it is essential that the optical fiber end faces be thoroughly cleaned before the optical fiber ends are connected in light-transmitting relationship to each other, and/or reconnected after they become contaminated during normal use and maintenance.

Some optical fiber ferrules have lensed ferrule end faces and are more commonly known as expanded beam ("EB") ferrules. Among the advantages of EB ferrules as compared to non-EB ferrules are that the EB fiber optic ferrules show a greater tolerance for particulate contamination and provide some physical protection of the end of the optical fiber core. In addition, inasmuch as there is an air gap between mated lenses of EB fiber optic ferrules lower mating forces are required to make and hold the connection. Such EB ferrules have a lens at the end face of the ferrule which lens may be an imaging lens or, more commonly, a collimating lens. When two optical fibers having lensed ferrule end faces are to be connected, their respective convex surface lenses face each other with a small air gap between the lenses. Adequate cleaning of such EB fiber optic ferrule end faces present difficulties not encountered in cleaning the end surfaces of non-lensed, i.e., non-EB, fiber optic ferrule end faces.

Related Art

One practice in the cleaning of optical fiber connectors is to rub each ferrule end face against a fabric- or paper-based cleaning strip, sometimes using a cleaning solvent such as alcohol. This method requires that the ferrule end face be fully exposed for proper cleaning, but this is often impractical because the ferrule end face is often recessed within a connector or coupler and it would be necessary to disassemble the connector or coupler in order to clean the ferrule end face. In these circumstances, the ferrule end face is sometimes cleaned using a swab.

U.S. Pat. No. 7,401,374 "Article For Cleaning Optical Fibers" issued on Jul. 22, 2008 and related (divisional) U.S. Pat. No. 7,685,668, "Article For Cleaning Optical Fibers", issued on Mar. 30, 2010, both to Jay S. Tourigny, and are assigned to the assignee of this application. Both these patents, the entire subject matter of which is incorporated by reference herein, concern cleaning devices for cleaning the ferrule end surfaces of optical fibers. The patented cleaning devices comprise a coherent body having a cleaning head in the form of a swab of thermally sintered polymer particles or polymer fiber strands, or a mixture of such particles and strands, having an open-cell structure. The patented devices comprise cleaning heads having zones of different polymer density and are well adapted to cleaning non-lensed, that is, non-EB, ferrule end faces of an optical fiber, particularly when the end face is recessed within a connector or coupler. Reducing polymer density in a given zone is attained by increasing the porosity of the polymer in such zone. Column 4, lines 55-61 of U.S. Pat. No. 7,685,668 discloses a compression zone pore volume of about 20% to about 80%, e.g., 50%, of the volume of the porosity matrix. The compression zone is that zone of the cleaning head which terminates in a contact area which contacts the ferrule end to be cleaned. The increased pore volume of the compression zone both enhances its cleaning ability (column 6, lines 21-36) and reduces the amount of force required to make the cleaning head conform to the shape of the ferrule end being cleaned (column 6, lines 37-39). Cleaning is carried out by rotating the cleaning device swab with the cleaning head pressed against the ferrule end face.

The aforesaid U.S. Pat. Nos. 7,401,374 and 7,685,668 describe an advance in the art in that the thermally sintered polymers eliminate a potential source of loose or broken fiber contamination and the zones of different polymer density facilitate thorough cleaning of the optic fiber ferrule ends as well as the side walls of the connector device connecting the ferrules to each other. However, the significantly different geometry of EB ferrule ends as compared to non-EB ferrule ends limits the effectiveness of prior art swabs for cleaning EB ferrule ends.

U.S. Pat. No. 5,925,191, issued on Jul. 20, 1999 to Stein et al., discloses a "rod" for cleaning and/or polishing various ferrules in a fiber optic connector. As illustrated in FIG. 1, the end face of optical fiber 103 and ferrule 104 are cleaned by contact with the end face at the bottom of the rectilinear hole 106. See column 4, lines 16-23. FIGS. 3 and 4 of Stein et al. are cross-sectional views of other embodiments of the cleaning rod having rectilinear openings at opposite ends. The embodiment of FIG. 4 includes a curved concave working surface 129 at the closed end of rectilinear hole 125. See column 5, line 43 et seq. As described at column 5, lines 53-57, the working surface 129 has a concave curve larger than the corresponding radius of the convex surface of the end face of a typical ferrule 104 (FIG. 1), so that the working surface 129 does not cut into the end face of the ferrule during polishing.

U.S. Pat. No. 6,810,552, issued on Nov. 2, 2004 to Miyake et al., discloses in FIG. 1 a cleaner 21 retained in a holding tool 22 which is described starting at column 4, line 19. As shown in FIG. 2, the cleaner 21 comprises a cylindrical main body 24 and a plug 25 fitted within the main body 24. Main body 24 is comprised of layers of polyester cloth adhered to each other with an adhesive and has a ferrule insertion hole 26 formed in the distal end of the body 24. See column 4, lines 26 et seq. The plug 25 is formed in a similar manner except in the shape of a solid cylinder rather than a tube. See column 4, line 51 et seq. Cleaning is accomplished as described starting at column 4, line 65, and illustrated by FIG. 2, which shows ferrule 12 aligned with hole 26 of the cleaner. The other embodiments illustrated in the remaining figures of Miyake et al. have in common the hollow tubular cylindrical member terminating in an inner wall (27 in FIGS. 1 and 2, 34 in FIGS. 3A-4B, etc.). The inner walls serve to contact and clean the end of the ferrule.

SUMMARY OF THE INVENTION

The present invention provides a cleaning device, preferably in the form of a swab, in which the cleaning surface at the distal end of the swab, i.e., at the distal end of the cleaning head, has a curved concave configuration, which configuration facilitates thorough cleaning of lensed (expanded beam or "EB") ferrule end faces.

The concave configuration of the cleaning surface of the cleaning head enables rotation of the swab about the lenses to efficiently engage the cleaning surface with the lens surfaces. The cleaning head has a polymer density which allows it to conform to the lenses being cleaned, and preferably allows it to conform as well to the end faces of non-EB ferrules. Hardness of the cleaning head may vary along the length of the cleaning head as taught in the aforesaid U.S. Pat. Nos. 7,401,374 and 7,685,668.

Specifically, in accordance with the present invention there is provided a cleaning device for cleaning an optical fiber end face, the cleaning device comprising a cleaning head terminating in a curved concave cleaning surface.

The concave cleaning surface may comprise a bowl-shaped depression terminating in either a non-crenulated or a crenulated peripheral leading edge. In one aspect of the present invention, the concave cleaning surface comprises a U-shaped groove disposed perpendicularly to the longitudinal axis of the cleaning head, whereby the crenulated peripheral leading edge has a saddle shape configuration.

Other aspects of the present invention provide for one or more of the following features, alone or in any suitable combination: the concave cleaning surface may be dimensioned and configured to conform to a portion of the surface of a lens of a convex lensed optical fiber; the cleaning head may comprise a polymeric open-celled structure in the form of a coherent body of one or more thermally sintered polymers; the cleaning head may have at least two zones, a distal zone terminating in the cleaning surface and a proximal zone disposed adjacent to the distal zone, wherein the distal zone has a polymer density which is less than the polymer density of the proximal zone.

Another aspect of the present invention provides a cleaning device for cleaning a lensed optical fiber, the cleaning device comprising a cleaning head terminating in a curved concave cleaning surface. The cleaning head is dimensioned and configured to be inserted into a ferrule connector for a lensed ferrule and comprises a polymeric open-celled structure in the form of a coherent body of one or more thermally sintered polymers. The coherent body has at least a distal zone which terminates in the concave cleaning surface, and a proximal zone adjacent to the distal zone, wherein the distal zone has a polymer density which is less than the polymer density of the proximal zone.

Other aspects of the present invention provide one or more of the following features, alone or in any suitable combination: the polymer density of the proximal zone may be about 10% to about 50% greater than the polymer density of the distal zone; the open-celled structure may be formed from one or both of thermally sintered particles of polymeric material and thermally sintered strands of polymeric material; the cleaning device may further comprise a handle secured to the proximal zone of the cleaning head; the cleaning head may be substantially circular in cross section; the cleaning head may have a diameter of from about 0.04 inch to about 0.13 inch and an effective length of from about one quarter inch to about one inch; and the polymer density of the distal zone may be from about 80% to about 20%, e.g., from about 50% to about 20%, to thereby facilitate deformation of at least that portion of the cleaning head which terminates in the cleaning surface, to better conform the cleaning surface to the configuration of an optical fiber end face during cleaning thereof by the cleaning device.

As used herein, the following terms have the indicated meanings. The term "polymer density" means the percentage of a given volume of sintered polymer that is occupied by the solid polymer as opposed to that portion of the volume that is occupied by the pores or open cells of the sintered polymer. Thus, a polymer density of 75% means that the solid polymer occupies 75% of the volume and pores, i.e., open cells, occupy 25% of the volume. The term "pore volume" is the opposite of pore density, pore volume being the volume occupied by the pores, e.g., the pore volume is 30% if the polymer density is 70%.

BRIEF DESCRIPTION OF THE DRAWINGS

FIGS. 1A-1D schematically show cross-sectional views of the ends of conventional fiber optic strands encased within rod-like ceramic ferrules wherein FIG. 1A shows an expanded beam ferrule having a lens affixed thereto and FIGS. 1B, 1C and 1D show different types of non-lensed ferrules;

FIG. 3 is a schematic partial elevation view of a cleaning device in accordance with the prior art;

FIG. 3A is an end view taken along line A-A of FIG. 3;

FIG. 4 is a schematic partial elevation view of a cleaning device in accordance with one embodiment of the present invention;

FIG. 4A is an end view taken along line A-A of FIG. 4;

FIG. 4B shows the cleaning device of FIG. 4 rotated ninety degrees about its longitudinal axis from the position shown in FIG. 4;

FIG. 4C is an end view taken along line C-C of FIG. 4B;

FIG. 9 is a schematic cross-sectional rendition of one of the ferrule connectors of FIG. 2 with a cleaning head (part broken away) poised to clean the lens of the expanded beam fiber optic.

DETAILED DESCRIPTION OF THE INVENTION AND SPECIFIC EMBODIMENTS THEREOF

Figure 1A:
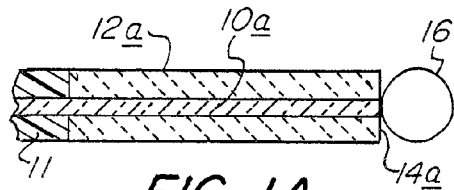

The accompanying drawings are not drawn to scale or in proportion; for example, the thickness of fiber optic strands and the depth of the concave configuration of the cleaning head cleaning surface are significantly exaggerated for clarity of illustration. As shown in FIG. 1A through 1D, the ends of individual fiber optic strands 10a, 10b, 10c and 10d have had a portion of their outer sheaths 11 stripped away. The stripped portions are respectively bonded and encased in the center of rod-like ceramic ferrules 12a, 12b, 12c and 12d. Each ferrule has a respective end face 14a, 14b, 14c and 14d. Respective ends of the fiber optic strands 10a-10d are exposed at the respective ferrule end faces 14a-14d. The ferrules 12a-12d provide a rigid support for the fiber optic strands 10a-10d which enable their ends to be polished and cleaned. End faces 14b-14d show, respectively, an angled end face 14b, a slightly rounded end face 14c in which the outer periphery of end face 14c has been rounded, and a flat end face 14d disposed substantially perpendicularly to the longitudinal axis of ceramic ferrule 12d. The ceramic ferrules 12b-12d are non-EB fiber optic ferrules whereas ferrule 12a has affixed to its end face 14a a lens 16 which may be of spherical or approximately spherical configuration. Lens 16 is usually a collimating lens although it may be an imaging lens, and is disposed in optical-transmitting relation to its associated fiber optic strand 10a.

Figure 2:
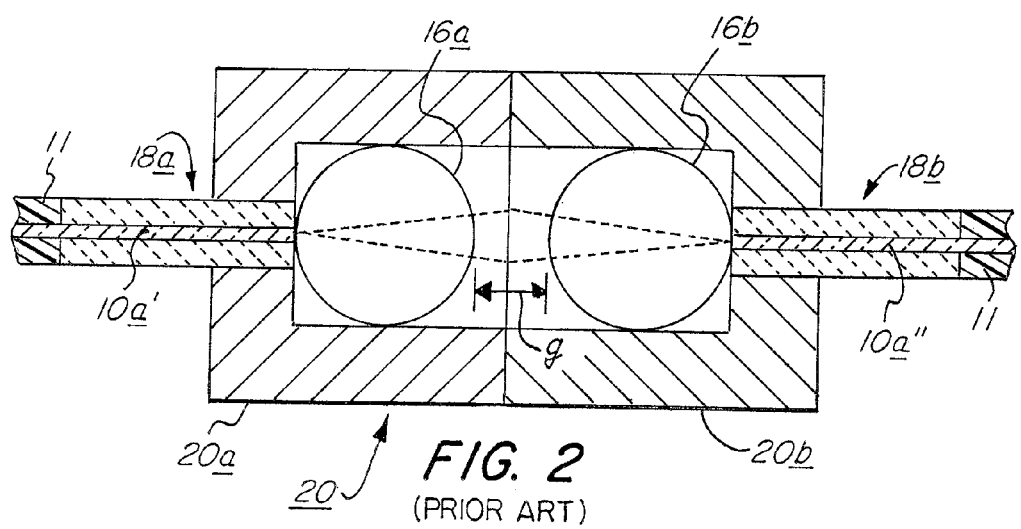
FIG. 2 is a schematic cross-sectional rendition of two expanded beam optic fiber strands connected to each other by ferrule connectors.

FIG. 2 shows a pair of the EB ferrules 18a, 18b, which are similar to EB ferrule 12a of FIG. 1A. Ferrules 18a, 18b have their respective lenses 16a, 16b optically connected to each other by a coupler or bulkhead 20 which may comprise first and second ferrule connectors 20a and 20b connected to each other by any suitable means, such as mechanical fasteners. First ferrule connector 20a and second ferrule connector 20b are each configured to be uncoupled from each other in order to permit inspection and cleaning of the connected ferrule end faces. Cleaning is accomplished by inserting the swab-like cleaning device into the open ends of the first and second ferrule connectors 20a, 20b. As is conventional in the art, an air gap g is maintained between lenses 16a and 16b. The beam of light energy transferred from fiber optic strand 10a' via lens 16a to lens 16b thence to fiber optic strand 10a" is indicated by the dash lines showing the cone of light diverging outwardly from fiber optic strand 10a' and lens 16a and converging in lens 16b to enter fiber optic strand 10a". The arrangement of FIG. 2 is known in the art and forms no part of the present invention. Such coupler devices are also used to connect non-EB ferrules ends.

FIG. 3 shows a prior art cleaning device 22 comprised of a cleaning head 24 mounted on a handle 26. Handle 26 is broken away in FIG. 3. As seen in FIGS. 3 and 3A, cleaning head 24 has a cleaning surface 24a which is substantially flat and, when cleaning device 22 is used, cleaning surface 24a contacts the exposed end of the fiber optic strand in the end face of the ferrule.

FIGS. 4 and 4A are views corresponding to those of FIGS. 3 and 3A but showing an embodiment of the present invention wherein cleaning device 28 comprises a cleaning head 30 mounted on a handle 32 which is broken away in FIGS. 4 and 4B. FIGS. 4B and 4C each show cleaning device 28 rotated ninety degrees about its longitudinal axis L-L (FIG. 4B) relative to the position shown, respectively, in FIGS. 4 and 4A. The cleaning surface 30a of cleaning head 30, as will be appreciated from FIGS. 4, 4A and 4C, has a U-shaped cross section channel 30b formed therein and extending transversely, e.g., perpendicularly of the longitudinal axis of cleaning head 30. The U-shaped cross section has a radius r. The length of radius r is greatly exaggerated in the drawings for clarity of illustration. As seen in FIG. 4B, the sides of channel 30b are rounded at both ends of channel 30b. The configuration of cleaning surface 30a is such that a pair of oppositely disposed leading edge projections 30c are formed at cleaning surface 30a providing a saddle shape configuration to the cleaning surface. In FIG. 4, a dotted line X-X delineates distal zone D of cleaning head 30 from proximal zone P. The distal and proximal zones of the cleaning heads are discussed below.

The cleaning surface 30a is seen to be configured to establish good surface-to-surface contact with the convex, e.g., spherical or rounded, exterior surface of lenses 16a and 16b, thereby promoting efficient and thorough cleaning of the lenses. As with other embodiments of the present invention, cleaning surface 30a and at least the adjacent portion of cleaning head 30 are not enclosed within another structure so that at least the portion of cleaning head 30 adjacent to cleaning surface 30a can enter respective first and second ferrule connectors 20a, 20b (FIG. 2) to bring cleaning surface 30a into good cleaning contact with lenses 16a, 16b. Usually, the entire length of cleaning head 30 which projects beyond handle 26 (the "effective length" of the cleaning head) is free of any structure which would impede its entry into first and second ferrule connectors 20a or 20b or the like structure. Of course, a fresh cleaning device 28 is normally used for each lens to ensure good cleaning.

The density of cleaning head 30, and in particular of cleaning surface 30a thereof, is selected so that it readily deforms under pressure applied by the user through the handle 32 to enhance thorough cleaning and full engagement of the surface of the lenses 16a and 16b or at least of the portions thereof facing each other and through which light is transmitted between lenses as illustrated in FIG. 2. The radius of concave cleaning surface 30a is shown at r in FIG. 4 and may be of any suitable length. A specific embodiment of the present invention calls for a radius r of about 0.75 millimeters ("mm"). Similarly, any suitable dimensions of cleaning head 30 and handle 32 (FIGS. 4-4C) may be used. The diameter of cleaning head 30 (and of at least the portion of handle 32 adjacent cleaning head 30) may be sized to accommodate most standard 1.25 mm or 2.50 mm connector end face geometries of the first and second ferrule connectors 20a, 20b of FIG. 2. The length of the handle 132 of cleaning device 134 illustrated in FIG. 8 may be from about 125 to about 130 mm and the length l of that portion of cleaning head 130 which projects from handle 132 may be about 10 mm. The 0.75 mm radius r is an appropriate size for cleaning current versions of lenses 16a, 16b (FIG. 2) but obviously may be changed to accommodate different size lenses. The above dimensions may of course apply to all embodiments of the present invention, including those illustrated in FIGS. 5, 5A and 6, 6A. The curved concave shapes of the cleaning surfaces of the present invention, e.g., surface 30a of FIGS. 4-4C, accommodate the substantially spherical exterior of that portion of lenses 16a, 16b which face each other and through which light transmission is effectuated. In addition, the concave cleaning surfaces provide an enhanced surface area available for cleaning as compared to cleaning surface 24a of the prior art embodiment illustrated in FIG. 3. The leading edges, such as the leading edges 30c (FIGS. 4A and 4C) enhance cleaning by trapping particulate and other surface contaminants.

Figure 5A:
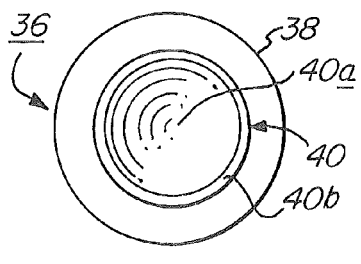
FIG. 5A is an end view taken along line A-A of FIG. 5.
Figure 5:
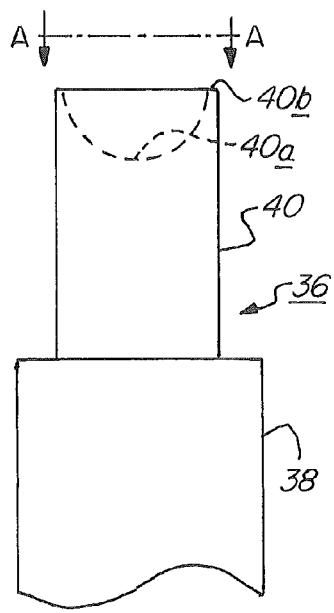
FIG. 5 is a schematic partial elevation view of a cleaning device in accordance with a second embodiment of the present invention.

FIGS. 5 and 5A show a cleaning device 36 in accordance with another embodiment of the invention comprising a handle 38 (broken away) from which a cleaning head 40 protrudes. A cleaning surface 40a is formed by a bowl-shaped depression at the distal end of cleaning head 40, cleaning surface 40a having a peripheral circular-shaped non-crenulated leading edge 40b extending around it. As used herein and in the claims a "non-crenulated" leading edge is a cleaning edge which lies entirely in a single plane which is transverse, e.g., perpendicular, to the longitudinal axis of the cleaning head. As is the case with the other embodiments of the invention, the radius (r in FIG. 4, not shown in FIG. 5 or 6) is significantly exaggerated in the Figures for clarity of illustration.

Figure 6A:
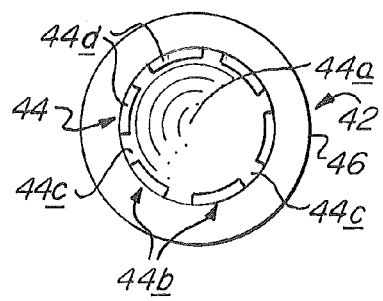
FIG. 6A is an end view taken along line A-A of FIG. 6.
Figure 6:
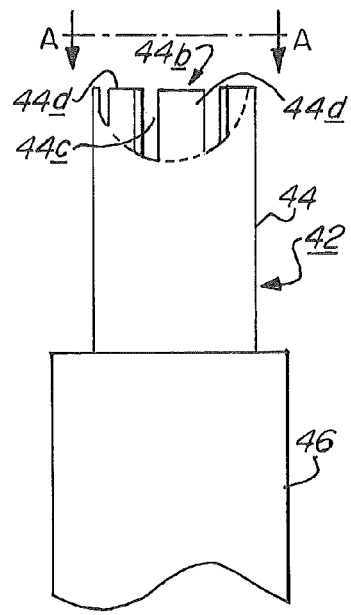
FIG. 6 is a schematic partial elevation view of a cleaning device in accordance with a third embodiment of the present invention.

FIGS. 6 and 6A show yet another embodiment of the present invention in which a cleaning device 42 has a cleaning head 44 protruding from a handle 46 (broken away). In this case, the cleaning surface 44a is, like the cleaning surface 40a of the embodiment of FIGS. 5 and 5A, bowl-shaped, but the leading edge 44b is crenulated, having a series of cutouts 44c separated by tongue-like projections 44d. This construction provides a somewhat brush-like effect when cleaning head 44 is rotated about the lens of an EB ferrule end face during cleaning. As shown in the accompanying figures, the cleaning head terminates in the curved cleaning surface and is not enclosed by any other structure nor is any structure disposed adjacent to and co-extensive with the cleaning head. This feature enables the cleaning head to enter a ferrule connector, such as first and second ferrule connectors 20a and 20b of FIG. 2 and bring the curved cleaning surface of the cleaning head into direct contact with the lenses, such as lenses 16a and 16b illustrated in FIG. 2. In this regard, see FIG. 9 and its description below.

Figure 1B:
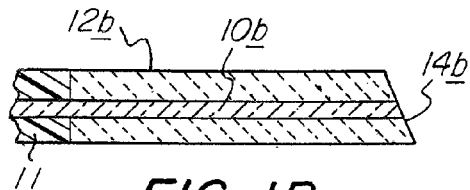
Figure 1C:
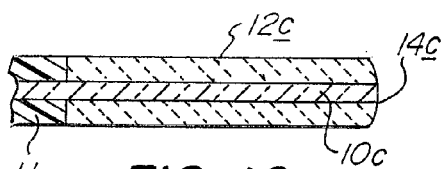
Figure 1D:
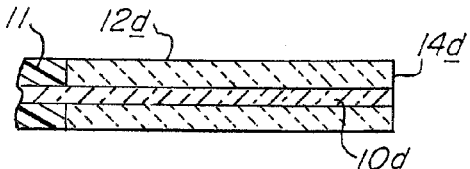
Figure 7A:
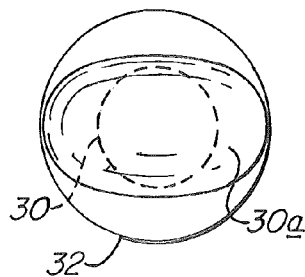
FIG. 7A is an end view taken along line A-A of FIG. 7.
Figure 7:
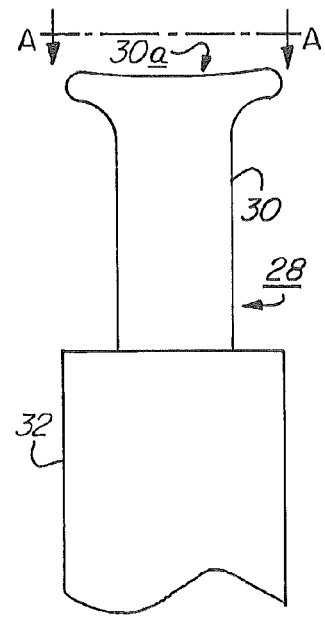
FIG. 7 is a view corresponding to that of FIG. 4 but showing the cleaning head of the cleaning device of FIG. 4 deformed after being used to clean a non-EB optical fiber ferrule end face.

Although particularly well adapted to be used to clean EB ferrules such as those illustrated in FIGS. 1A and 2, the cleaning devices of the present invention may also be used to clean non-EB ferrule ends of the type illustrated in FIGS. 1B through 1D. The cleaning of such non-EB ferrule end faces, as well as the cleaning of EB ferrule end faces, is facilitated by making at least those portions of cleaning heads 30, 40 and 44 which are adjacent to their respective cleaning surfaces 30a, 40a, 44a of sufficiently low density, i.e., sufficiently soft, so that those portions are easily deformed when engaged with ferrule end faces and the exposed fiber optic strands therein. The post-use deformed appearance of the cleaning head of the embodiment of FIGS. 4-4C is illustrated in FIGS. 7 and 7A. These Figures show the deformed football-like appearance of cleaning surface 30a after being pressed against relatively flat end faces such as end faces 14b, 14c and 14d of FIGS. 1B-1D. The deformation shown in FIGS. 7 and 7A enhances the cleaning surface area available for contact with relatively flat ferrule end faces. The "football" ellipse shape of the deformed cleaning head 30 also establishes two new leading edges which enhance cleaning as the cleaning device is rotated against the end face during cleaning. A somewhat lesser degree of deformation may be sustained when cleaning lensed ferrule end faces such as that illustrated in FIG. 1A, but deformability of the cleaning head helps to ensure full contact and good cleaning. As discussed above with respect to U.S. Pat. No. 7,685,668, such deformability (softness) is attained by increasing the pore volume of the cleaning head, or at least of that portion of the cleaning head adjacent to its cleaning surface.

While the cleaning heads may be made of any suitable material, the sintered polymeric open-celled material disclosed in the aforesaid U.S. Pat. Nos. 7,401,374 and 7,685,668, are well-suited for use in the present invention. A cleaning head made from one or more sintered polymers demonstrates excellent chemical stability and solvent resistance. Sintered polymers will not leach plasticizers, out-gas vapors, or be affected by solvent contact. This assures the cleaning head does not contribute contamination or hazing to the fiber optic surface. Polymer types from which cleaning heads according to this invention may be prepared include polyethylene, polyacetal, polyolefin, polyester, high density polyethylene (HDPE), very high molecular weight polyethylene (VHMWPE), ultra high molecular weight polyethylene (UHMWPE), polytetrafluoroethylene (PTFE), nylon, polypropylene, polyvinylidene fluoride (PVDF) and polyethersulfone (PES). Suitable polymers may have glass transition temperatures between −30 and 225° C., and the ratio between their melting points and their glass transition temperatures, expressed in degrees Kelvin, may be between 1.2 and 2.55.

A suitable pore size in the polymer matrix in the distal zone of a cleaning head typically may be not greater than about 50 micrometers, e.g., it may range from about 10 to about 42 micrometers, e.g., about 30 micrometers. The polymer density of the distal zone may range from about 80% to about 20%, which translates, conversely, to a pore volume of from about 20% to about 80% of the overall matrix volume. In one embodiment, a 50% pore volume was found to be suitable.

Cleaning heads having zones of different polymer density as also disclosed in the aforesaid two patents are also well-suited for use in the present invention. Generally, the distal portion of the cleaning head, that is, the portion adjacent the cleaning surface, may be softer than the proximal end of the cleaning head. That is not however a necessary feature of the present invention, and the cleaning head may be of uniform hardness and uniform porosity throughout. The curved concave cleaning surface of the cleaning head of the present invention conforms so well to EB lensed ferrules that it is not necessary to make the cleaning head, or part thereof, soft enough to be significantly (or at all) deformed when pressed into contact with the EB lens during cleaning of the lens. However, the combination of the curved cleaning surface and sufficient softness to enhance deformation provides for enhanced cleaning performance of both EB and non-EB ferrules.

Figure 8:
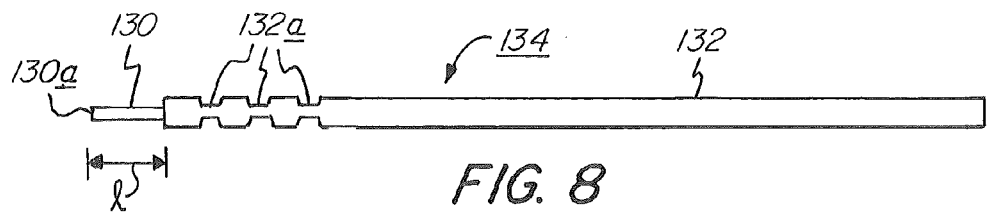
FIG. 8 is a schematic elevation view of a cleaning device in accordance with an embodiment of the present invention and comprising a longitudinally extending handle having a cleaning head at one end thereof.

FIG. 8 is an elevation view of cleaning device 134 in accordance with the present invention comprising a handle 132 having a cleaning head 130 configured in accordance with the present invention affixed to one end thereof. Handle 132 is conveniently a hollow plastic tube, the interior of which (not shown) has a diameter which snugly receives a portion of the length of cleaning head 130. A series of crimps 132a securely retains cleaning head 130 in place on handle 132. A length of cleaning head 130 projects outwardly from an end of handle 132. The protruding portion of cleaning head 130 is not encased in or adjacent to any other structure so that cleaning head 130 may without impediment extend into a ferrule coupler or the like. The portion of cleaning head 130 which protrudes from handle 132, the effective length of the cleaning head, is shown at l in FIG. 8 and is long enough to insure good contact of cleaning surface 130a with a ferrule end face contained within a ferrule coupler or the like. In other embodiments, the handle 132 may have a cleaning head 130 disposed at each opposite end thereof and each cleaning head may have a cleaning surface of the type illustrated in FIGS. 4-6B at both ends thereof. Alternatively, cleaning device 134 may have a cleaning head in accordance with the present invention at one end thereof and a prior art cleaning head at the other end thereof.

FIG. 9 shows the first ferrule connector 20a of FIG. 2 disconnected from the second ferrule connector 20b of FIG. 2 but remaining connected to EB ferrule 18a and the fiber optic strand 10a' which it encloses. Beyond ferrule 18a, fiber optic strand 10a' is encased by outer sheath 11. Cleaning head 30 is shown poised to have concave cleaning surface 30a thereof brought to bear against the exposed portion of the surface of spherical lens 16a. When brought into such contact, cleaning head 30 may be rotated about its longitudinal axis to effectuate cleaning of lens 16a. Leading edges 30c ensure good cleaning at the junction between the interior of first ferrule connector 20a and lens 16a.

It will be appreciated that numerous variations may be made to the specific embodiments described and illustrated herein and that such variations are included within the scope of the present invention.

What is claimed is:

1. A cleaning device for cleaning an optical fiber end face, the cleaning device comprising a cleaning head comprising a polymeric open-celled structure and having a distal zone which terminates in a curved concave cleaning surface, and wherein at least the distal zone portion of the cleaning head is of sufficiently low density to undergo deformation by cleaning engagement with such end face, and to retain such deformation after such engagement.

2. The cleaning device of claim 1 wherein the concave cleaning surface comprises a bowl-shaped depression terminating in a non-crenulated peripheral leading edge.

3. The cleaning device of claim 1 wherein the concave cleaning surface comprises a bowl-shaped depression terminating in a crenulated peripheral leading edge.

4. The cleaning device of claim 1 wherein the cleaning head has a longitudinal axis and the concave cleaning surface comprises a U-shaped groove disposed perpendicularly to the longitudinal axis of the cleaning head, whereby the cleaning surface has a saddle shape configuration.

5. The cleaning device of any one of claim 1, 2, 3 or 4 wherein the concave cleaning surface is dimensioned and configured to conform to a portion of the surface of a convex lens of a lensed optical fiber.

6. The cleaning device of any one of claim 1, 2, 3 or 4 wherein the polymeric open-celled structure is in the form of a coherent body of one or more thermally sintered polymers.

7. The cleaning device of claim 6 wherein the cleaning head has at least two zones, the distal zone and a proximal zone disposed adjacent to the distal zone, wherein the distal zone has a polymer density which is less than the polymer density of the proximal zone.

8. A cleaning device for cleaning a lensed optical fiber contained within a ferrule connector, the cleaning device comprising:
  a cleaning head comprising a polymeric open-celled structure in the form of a coherent body of one or more thermally sintered polymers, the coherent body having at least a distal zone which terminates in a concave cleaning surface, and a proximal zone adjacent to the distal zone, wherein the distal zone has a polymer density which (i) is less than the polymer density of the proximal zone, and (ii) is sufficiently low that at least the distal zone undergoes deformation by cleaning engagement with such end face, and such deformation persists after such engagement, and wherein at least the concave cleaning surface and the distal zone of the coherent body are unenclosed and free of any structure which would impede entry of at least a portion of the distal zone of the cleaning head into such ferrule connector whereby to contact the curved cleaning surface with such lensed optical fiber.

9. The cleaning device of claim 8 wherein the polymer density of the proximal zone is about 10% to about 50% greater than the polymer density of the distal zone.

10. The cleaning device of claim 8 wherein the open-celled structure is formed from one or both of thermally sintered particles of polymeric material and thermally sintered strands of polymeric material.

11. The cleaning device of claim 8 further comprising a handle secured to the proximal zone of the cleaning head.

12. The cleaning device of claim 1 or claim 8 wherein the cleaning head is substantially circular in cross section.

13. The cleaning device of claim 12 wherein the cleaning head has a diameter of from about 0.04 inch to about 0.13 inch and an effective length of about one quarter inch to about one inch.

14. The cleaning device of claim 8 wherein the concave cleaning surface is dimensioned and configured to conform to a portion of the surface of a convex lens of a lensed optical fiber.

15. The cleaning device of claim 1 wherein such optical fiber end face is contained within a ferrule connector, and at least a portion of the distal zone of the cleaning head including the concave cleaning surface is unenclosed and free of any structure which would impede entry of the cleaning surface and at least a portion of the distal zone of the cleaning head into such ferrule connector, whereby to enable contact of the curved cleaning surface with such optical fiber end face.

16. The cleaning device of claim 8 or claim 15 wherein the entire cleaning head is unenclosed and free of any structure which would impede such entry of the cleaning head into such ferrule connector.

17. The cleaning device of claim 1 wherein the cleaning head has a proximal zone separated from the concave cleaning surface by the distal zone, the proximal zone having a greater polymer density than the distal zone, and further comprising a handle secured to the proximal zone.

* * * * *